United States Patent [19]

Miller

[11] Patent Number: 5,218,199

[45] Date of Patent: Jun. 8, 1993

[54] OPTICAL POSITION SENSOR HAVING RIGIDLY FIXED READ HEAD

[75] Inventor: Glen E. Miller, Redondo, Wash.

[73] Assignee: The Boeing Company, Seattle, Wash.

[21] Appl. No.: 872,726

[22] Filed: Apr. 21, 1992

[51] Int. Cl.$^5$ .............................. H01J 40/14
[52] U.S. Cl. .................... 250/231.13; 250/214 PR
[58] Field of Search ............... 250/231.13, 231.14, 250/214 PR, 211 K; 341/13; 324/175

[56] References Cited

U.S. PATENT DOCUMENTS

| | | | |
|---|---|---|---|
| 3,639,769 | 2/1972 | Clark | 250/211 K |
| 3,892,961 | 7/1975 | Bachmann | 250/211 K |
| 4,132,890 | 1/1979 | Garcia et al. | 250/231 |
| 4,320,293 | 3/1982 | Guretzky | 250/231.13 |
| 4,387,300 | 6/1983 | Dudash et al. | 250/239 |
| 4,698,616 | 10/1987 | Krohn et al. | 250/231.13 |
| 4,719,800 | 1/1988 | Moser | 250/231.13 |
| 4,740,688 | 4/1988 | Edwards | 250/231.13 |
| 4,774,463 | 9/1988 | Mizobuchi et al. | 324/175 |
| 4,806,751 | 2/1989 | Abe et al. | 250/231.13 |
| 4,928,008 | 5/1990 | Huggins et al. | 250/231.1 |
| 5,068,528 | 11/1991 | Miller et al. | 250/231.1 |

FOREIGN PATENT DOCUMENTS 178694 4/1986 European Pat. Off.
2245950 5/1975 France.

*Primary Examiner*—David C. Nelms
*Assistant Examiner*—Stephone B. Allen
*Attorney, Agent, or Firm*—Christensen, O'Connor, Johnson & Kindness

[57] ABSTRACT

An optical position sensor comprising an encoder plate (52) that includes a variable density code pattern (54) is disclosed. Disposed in contact with the encoder plate is a bearing plate (58) having a read head (60) rigidly mounted thereto. The encoder plate (52) is coupled by a flexible aligner (62) and a shaft (64) to an object whose position is to be sensed such that the bearing plate (58) remains in contact with the encoder plate (52) as the object moves. Thus, no gap occurs between the read head and the encoder plate. A series of channels (70) disposed in the bearing plate contain a lubricant having approximately the same index of refraction as the encoder plate (52) and bearing plate (58). The lubricant reduces abrasion between the encoder plate and bearing plate as well as reduces reflective losses.

17 Claims, 5 Drawing Sheets

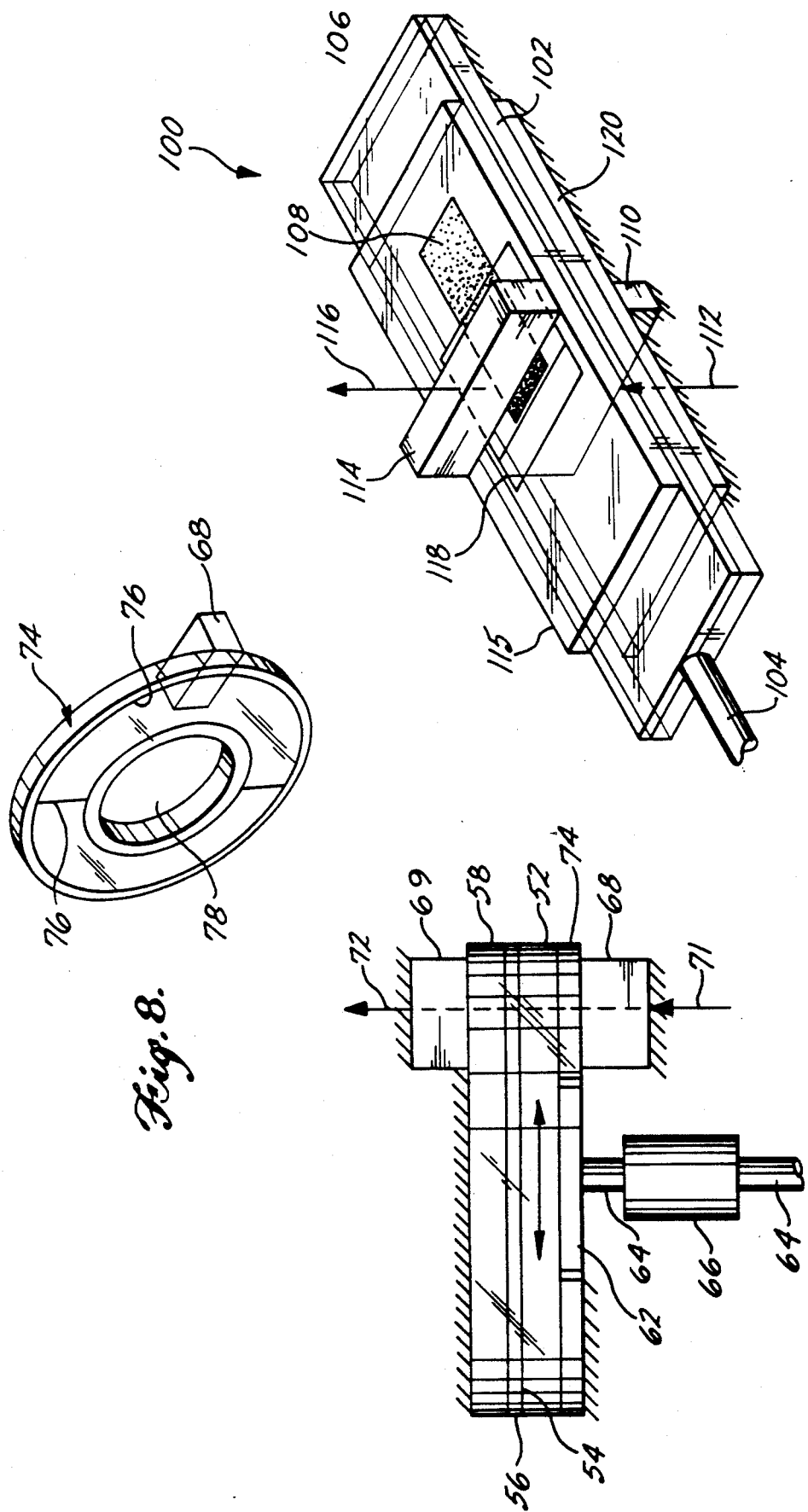

OPTICAL POSITION SENSOR HAVING RIGIDLY FIXED READ HEAD

FIELD OF THE INVENTION

The present invention relates generally to position sensors and, in particular, to optical position sensors.

BACKGROUND OF THE INVENTION

A variety of electrical sensors for sensing the relative position of an object are known in the art. Such sensors typically operate by varying the magnitude or frequency of an electric voltage, current or magnetic field as a function of the position of the object being sensed. While such electrical sensors work well for many applications, there are environments where they cannot be used. For example, because electrical sensors are susceptible to electrostatic and electromagnetic interference and coupling, they are not suited for use in the presence of strong electrostatic and electromagnetic fields. Also, electrical sensors may cause a spark, thereby posing a risk of explosion when placed in areas containing highly volatile vapors. Optical sensors, on the other hand, offer the benefits of being lightweight, immune to electrostatic and electromagnetic fields and are usable in the presence of explosive vapors. Therefore, optical sensors are being used more and more where electrical sensors had previously been used.

A typical optical sensor includes a rotatable encoder plate that is mechanically coupled to the object whose position is to be sensed such that the angular position of the encoder plate is controlled by the position of the object. A light source directs an incoming beam of light onto the encoder plate and a read head detects an outgoing beam of light having an intensity that is a function of the position of the encoder plate, thereby providing an indication of the position of the object.

One significant problem with prior art optical position sensor designs is the presence of an air gap that exists between the read head and the encoder plate. This air gap is the source of several problems. First, any loading of the mechanical linkage that couples the encoder plate to the object whose position is to be sensed can cause an angular misalignment between the encoder plate and the read head. For some sensors, an angular misalignment of only a few minutes of an arc can increase the optical path loss by several decibels. This variation in the optical path loss affects the intensity of the outgoing light beam and is indistinguishable from a change in intensity due to movement of the object. Similarly, mechanical loading of the linkage can also cause a change in the width of the air gap. An increase in the air gap by only a few thousandths of an inch also can increase the optical path loss by several decibels. Furthermore, the air gap provides an opportunity for contaminants to enter the optical path. If contaminants are present, they can cause total optical path loss, thereby rendering the sensor inoperative. Finally, the air gap between the read head and the encoder plate present refractive index discontinuities, which cause significant optical path losses unless suitable anti-reflective coatings are used. Similar problems exist with optical sensor designs that include a linear, as opposed to a rotary encoder plate. Further, the problems exist in both reflective and transmissive optical position sensors.

The present invention is directed to avoiding the problems associated with prior art optical sensor designs having an air gap between the read head and the encoder plate. Specifically the present invention is directed to providing an optical sensor that minimizes, if not entirely eliminates, angular misalignment between a stationary read head and a moving encoder plate. The present invention is also directed to providing an optical sensor that eliminates the possibility of contamination between optical surfaces and losses due to refractive index mismatch of the read head, encoder plate and air gap.

SUMMARY OF THE INVENTION

In accordance with this invention, an optical position sensor without an air gap between an encoder plate and a read head is provided. The sensor includes an encoder plate having disposed therein a code pattern that modulates a beam of light as a function of the position of an object coupled to the encoder plate. A bearing plate is disposed on the encoder plate and has a read head rigidly affixed thereto such that there is no air gap between the read head, bearing plate and encoder plate. The read head receives the beam of light that has been modulated by the code pattern, thereby producing an indication of the relative position of the object with respect to the read head. The elimination of the air gap eliminates the problems discussed above associated with an air gap.

In accordance with other aspects of this invention, the encoder plate is coupled to the object whose position is to be sensed by a flexible linkage. The flexible linkage assists in maintaining the encoder plate in contact with the bearing plate during the operation of the sensor.

In accordance with other aspects of this invention, the bearing plate includes a series of channels that contain a lubricant to reduce abrasion between the encoder plate and the bearing plate. Preferably, the lubricant is an oil having approximately the same index of refraction as the encoder plate and the bearing plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is an elevational view of a transmissive rotary position sensor according to the present invention;

FIG. 8 is an isometric view of a bearing plate used with the transmissive rotary sensor shown in FIG. 7;

FIG. 9 is an isometric view of a transmissive linear position sensor according to the present invention.

DETAILED DESCRIPTION OF THE DRAWINGS

Figure 1:
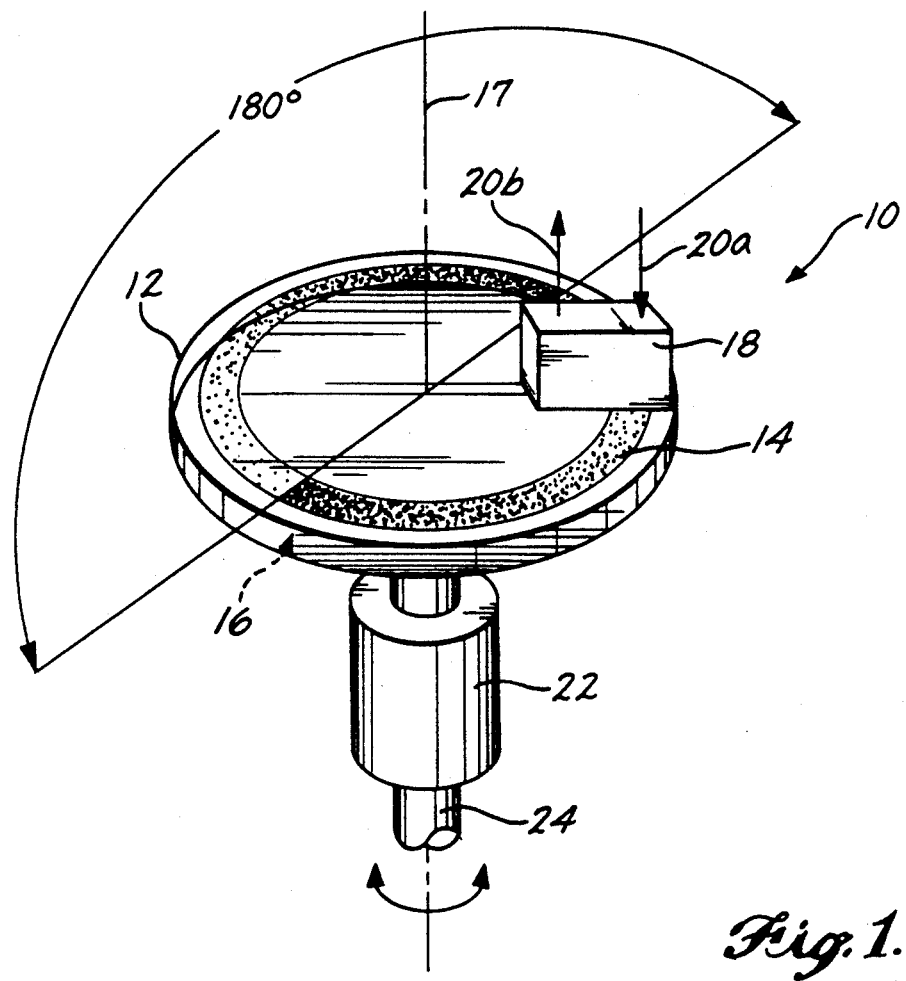
FIG. 1 is an isometric view of a reflective rotary optical position sensor according to the prior art.
Figure 2:
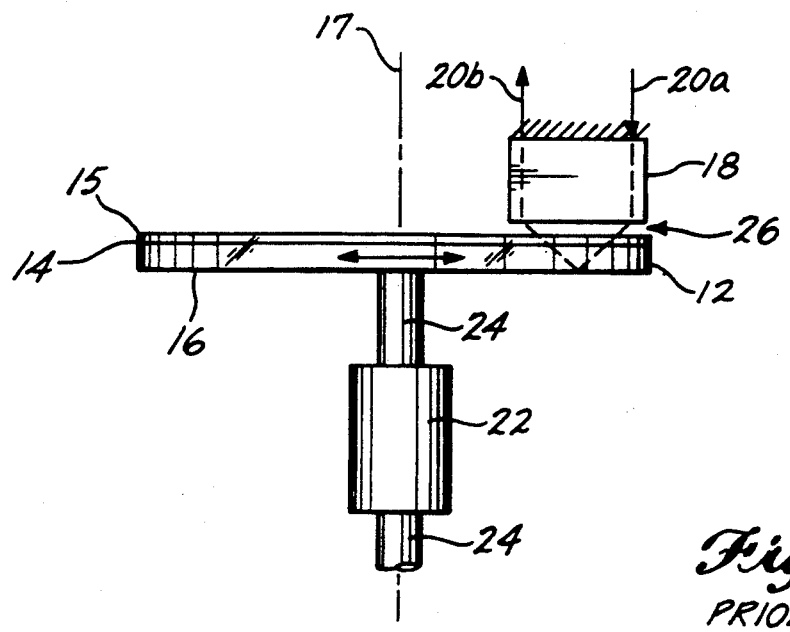
FIG. 2 is an elevational view of the rotary optical position sensor shown in FIG. 1.

For the purpose of illustrating the problems associated with optical position sensors containing air gaps, a typical prior art reflective rotary optical position sensor 10 is shown in FIGS. 1 and 2. The position sensor 10 shown in FIGS. 1 and 2 comprises a circular, transparent encoder plate 12. Disposed about the periphery on one surface of the encoder plate is a code pattern 14. The code pattern 14 has a pattern density that varies linearly through two 180° sectors located about the perimeter of the encoder plate 12. When the sensor is operating, only one of the 180° patterns is used. More than one pattern is typically disposed on the code plate at the time it is manufactured to increase the probability of obtaining a pattern with no defects in it. The opposing surface 16 of the encoder plate 12 is inwardly mirrored. The code pattern is covered by a protective transparent layer 15. As described below, the encoder plate 12 is mounted for rotation about an axis 17 that passes orthogonally through the center of the plate.

A read head 18 that remains stationary in relation to the movement of the encoder plate 12 directs an incoming beam of light 20a onto the encoder plate 12 such that the light beam impinges on a part of the code pattern 14 aligned with the read head. The density of the code pattern 14 determines the amount of light that passes through the pattern. The light passing through the pattern passes through the transparent encoder plate and impinges on the mirrored surface 16. The mirrored surface reflects the light beam back through the encoding plate 12 toward the read head 18. Depending upon the width of the code pattern 14 and the angle of the light beam, the beam may again pass through the code pattern. If the beam passes through the code pattern its intensity is further reduced. In any event, the read head 18 receives the reflected beam of light after it has passed at least once through the code pattern 14 and redirects it outwardly as an outgoing light beam 20b. The outgoing reflected beam of light 20b is typically transmitted through a fiber optic cable (not shown) to a remote photodetector that produces an electrical signal indicative of the magnitude of the reflected light beam to the read head.

The encoder plate 12 is mounted on one end of a shaft 24 whose axis is coaxial with the axis of rotation 17 of the circular encoder plate 12. The shaft 24 is supported by one or more bearings 22 and coupled to an object (not shown) whose position is to be sensed such that movement of the object causes rotation of the shaft 24. As a result, as the object changes position, the encoder plate is rotated, thereby increasing or decreasing the intensity of the outgoing beam of light 20b. Thus, the intensity of the outgoing beam 20b provides an indication of the relative position of the encoder plate 12 with respect to the read head 18 and, hence, the position of the object.

As best shown in FIG. 2 between the read head 18 and the encoder plate 12 is an air gap 26. This gap 26 is the source of the numerous problems stated above. Specifically, the gap 26 allows contaminants to block the optical path, causes optical path losses due to misalignment of the read head and the encoder plate and causes optical path losses due to refractive index discontinuities at the glass/air gap interface between the read head and the encoder plate. As described next, the present invention overcomes the problems associated with the air gap by eliminating the gap.

Figure 4:
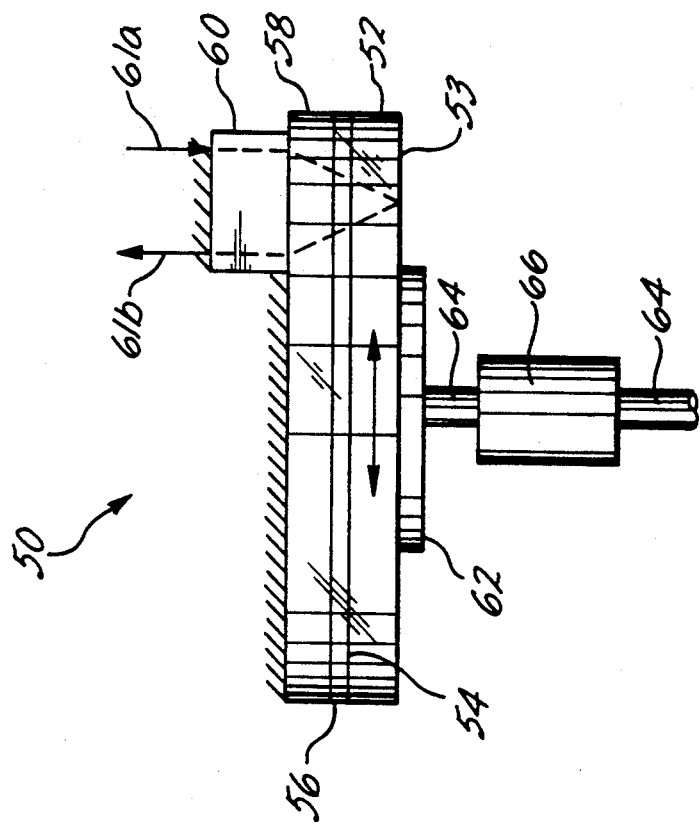
FIG. 4 is an elevational view of the rotary optical position sensor shown in FIG. 3.
Figure 3:
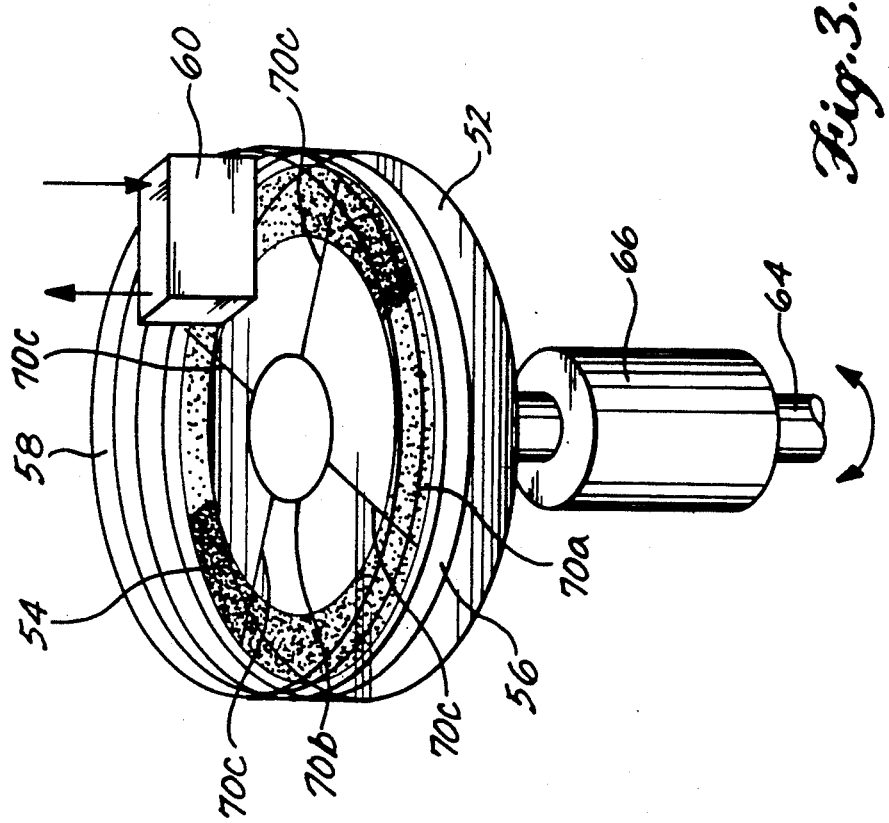
FIG. 3 is an isometric view of a reflective rotary optical position sensor according to the present invention.

FIGS. 3 and 4 show a rotational optical position sensor 50 formed according to the present invention. As with the prior art rotational optical position sensor 10 shown in FIGS. 1 and 2, the rotational optical sensor 50 shown in FIGS. 3 and 4 includes a circular, transparent encoder plate 52 having disposed on one surface a code pattern 54 that varies about the perimeter of the encoder plate. The code pattern 54 could comprise a linear (analog) pattern, similar to the code pattern 14 shown in FIG. 1, or a digital pattern, as will be apparent to those skilled in the art. The specific code pattern 54 shown in FIG. 4 has two 180° sectors, each of which varies linearly from one end to the other.

A cover plate 56 is fused to the encoder plate 52, atop the code pattern 54, to provide protection for the code pattern 54. Preferably, the cover plate 56 is made of the same type of transparent material as the encoder plate 52, so that there is no discontinuity of refractive indexes between the cover plate 56 and the encoder plate 52. Juxtaposed on top of the cover plate 56 is a circular bearing plate 58. The bearing plate 58 is also preferably formed of the same type of transparent material as the encoder plate 54 and the cover plate 56 to ensure no refractive index discontinuity. Due to the juxtapositioning of the bearing plate 58 no air gap exists between the bearing plate and the cover plate.

A read head 60 is rigidly mounted on the bearing plate 58 such that there is no gap between read head 60 and bearing plate 58. Since the details of how read heads are constructed are well known to those of ordinary skill in the optical sensor art they are not discussed here.

The encoder plate 52 is coupled to one end of a shaft 64 via a flexible aligner 62. The shaft 64, which is supported by one or more sets of bearings 66 is, in turn, coupled to the object (not shown) whose position is to be determined. The flexible aligner 62 prevents any radial or axial misalignments between the object and the shaft 64 from causing a separation between the encoder plate 52 and the bearing plate 58. Therefore, any optical path loss that such a separation would create is eliminated. As with prior art optical position sensors, an incoming beam of light 61a is directed by the read head 60 towards the code pattern 54. After passing through the code pattern, the beam is reflected off a mirrored surface 53 located on the remote side of the encoder plate 52. The reflected beam, which may or may not make another pass through the code pattern 54 is received by the read head. The reflected beam of light 61b received by the read head 60 is transmitted over a fiber optic cable (not shown) to an optical detector (also not shown). Since the intensity of the light beam is related to the position of the code pattern 54, which is related to the position of the object, the intensity of the light beam is indicative of the position of the object.

Figure 5:
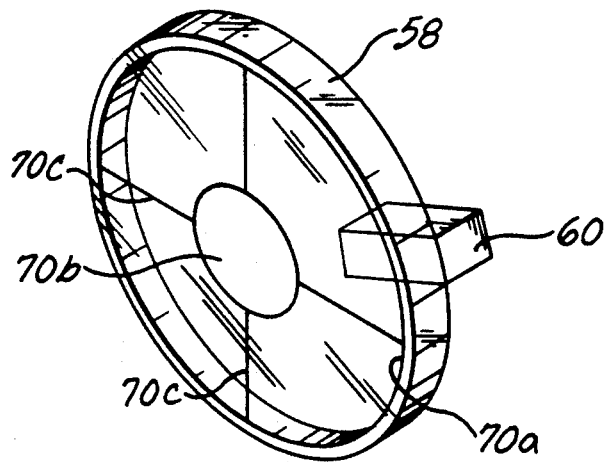
FIG. 5 is an isometric view of a bearing plate according to the present invention.
Figure 6:
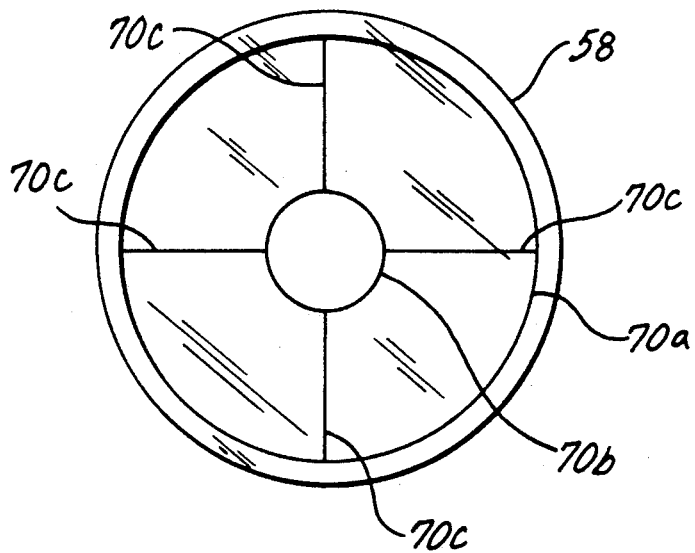
FIG. 6 is a plan view of the bearing plate illustrated in FIG. 5.

As shown in FIGS. 3, 5, and 6 disposed on the surface of the bearing plate 58 that contacts the cover plate 56 are a series of radial and circular (more fully described below) channels 70a, 70b and 70c that are filled with a small amount of lubricant. The lubricant preferably comprises a thin oil having approximately the same index of refraction as the encoder plate 52, cover plate 56 and bearing plate 58. In the preferred embodiment of the present invention, the encoder, cover plate and bearing plate are made of fused silica having an index of refraction equal to 1.46. Glycerine, hydraulic fluid, kerosene and purified mineral oil, readily available from numerous sources, have an equivalent index of refraction.

As the encoder plate 52 is moved by the object whose position is to be sensed, the lubricant contained within the channels 70a, 70b and 70c is wiped across the surface of the cover plate 56. This wiping action ensures a continuous thin film of lubricant over the surface of the cover plate 56. The wiping action also tends to sweep any microscopic contaminants into the grooves where they cannot interfere with the operation of the sensor. Furthermore, because the index of refraction of the lubricant has the same index of refraction as the cover plate 56 and bearing plate 58, any scratches that may develop at the interface of these two plates are filled by the lubricant and rendered virtually undetectable. Because the cover plate 56 and the bearing plate 58 are kept in contact by the flexible aligner 62, no gap occurs between the read head and the encoder plate even when a slight shaft misalignment occurs. Therefore, the aligner assists in eliminating problems associated with an air gap between the cover plate and the bearing plate.

FIG. 5 is an isometric view of a bearing plate 58 formed according to the present invention. As best shown in FIG. 5, the series of radial and circular channels 70a, 70b, and 70c that contact the cover plate are located on the surface of the bearing plate. FIG. 5 also shows that the read head 60 is rigidly fixed to the bearing plate and remains stationary with respect to the encoder plate as the encoder plate is moved by the object whose position is being sensed.

FIG. 6 is a plan view of a bearing plate 58 formed according to the present invention. A series of radial and circular channels include an outer perimeter (circular) channel 70a that lies outside of the code pattern 54 when the bearing plate is placed on the encoder plate, an inner perimeter (circular) channel 70b and a series of radial channels 70c that run between the outer and inner perimeter channels. Preferably, the channels 70 are about 0.010 inch wide and deep and are cut into the bearing plate using a programmed laser.

FIG. 7 is an elevational view of a transmissive-type rotary optical position sensor according to the present invention. The major differences between the transmissive-type optical position sensor and the reflective-type optical position sensor shown in FIG. 3 are the elimination of the mirrored surface and the placement of a second bearing plate (74) and a lens 68 in alignment with a read head 69 on the opposite side of the encoder plate from the read head. The lens 68, the second bearing plate (74) and the read head 69 remain stationary as the position of the encoder plate 52 changes. In a transmissive-type position sensor the lens 68 directs an incoming beam of light 71 through the code pattern 54 to the read head 69. The read head 69 receives the incoming beam of light 71 and directs an outgoing beam of light 72 to a remotely located photodetector (not shown) via a suitable medium, such as a fiber optic cable. As with the position sensor shown in FIG. 3, the transmissive sensor has no gap between the read head 69 and the encoder plate 52.

FIG. 8 is an isometric view of the bearing plate 74 shown in FIG. 7. The bearing plate 74 includes a center hole 78 that is large enough to accommodate the flexible aligner 62. A series of channels 76 contain a lubricant having approximately the same index of refraction as the bearing disk and the encoder disk 52. When assembled, the channels 76 are in contact with the under side of the encoder disk 52. The lens 68 is rigidly attached to the bearing disk.

FIG. 9 is an isometric view of a linear transmissive position sensor 100 according to the present invention. The position sensor 100 includes an encoder plate 102 that is connected to the object whose position is to be sensed by a linkage 104. Fused on top of the encoder plate 102 is a cover plate 106 that serves to protect a code pattern 108. While the code pattern 108 has a density that varies linearly from one end of the sensor to the other, a digital code pattern could also be used, if desired.

In contact with the top of the cover plate 106 is a bearing plate 115. Preferably the bearing plate is made from the same type of transparent material as the encoder plate 102 and cover plate 106. Mounted on the bearing plate on the side opposite to the side facing the encoder plate 102 is a read head 114. The read head and the bearing plate are mounted in a fixed position. A lens 110, is rigidly mounted to a second bearing plate 120, in alignment with the read head 114. The lens 110 directs an incoming beam of light 112 through the code pattern 108 to the read head 114. Since the lens 110 and the bearing plate 120 are fixedly mounted, they remain stationary while the encoder plate 102 is moved by the object whose position is to be sensed. As with the rotary-type position sensors described above, the intensity of an outgoing beam of light 116 produced by the read head 114 is indicative of the position of the object.

A series of channels 118 are disposed on the under side of the bearing plate 115 and the top side of the bearing plate 120 and contain a small amount of lubricant. As described above, the lubricant preferably has the same indexed refraction as the cover plate, encoder plate and bearing plates. Like the rotary-type optical position sensors described above, the linear optical position sensor 100 shown in FIG. 9 has no gap between the read head 114 and the encoder plate 102, nor is there an air gap between the lens 110 and the encoder plate 102. As a result, the problems associated with such a gap are eliminated. As will be appreciated by those skilled in the art, the transmissive linear position sensor shown in FIG. 9 could be reconfigured as a reflective-type linear optical position sensor similar to the reflective-type rotary optical position sensor shown in FIG. 3 by mounting a suitable read head and a mirrored surface on the encoder plate 102 and mirroring the side of the encoder plate 102 remote from the code pattern 108.

Figure 10:
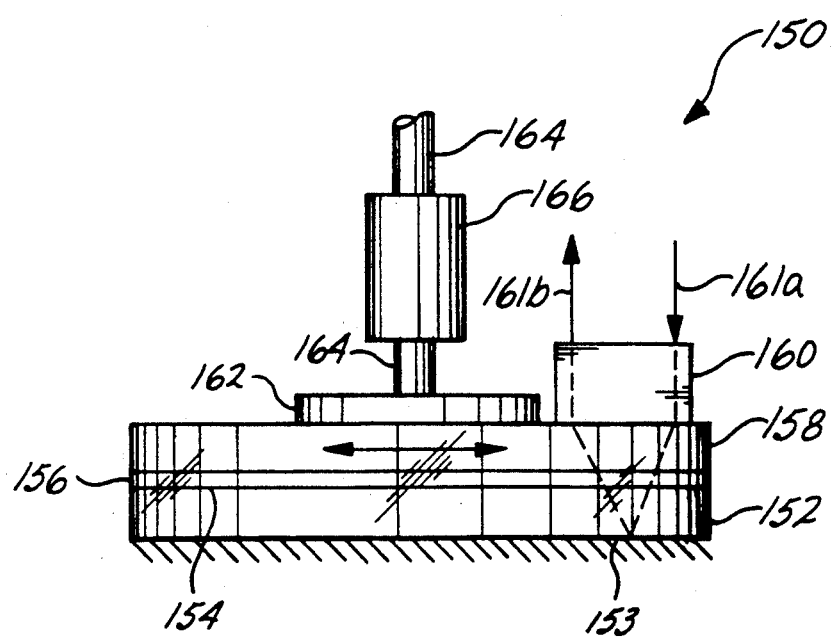
FIG. 10 is an elevational view of an alternative embodiment of a reflective rotary optical position sensor according to the present invention.

FIG. 10 is a side elevational view of an alternate embodiment of a rotary position sensor 150. The position sensor 150 includes a transparent code plate 152 having a code pattern 154 (similar to code pattern 54 shown in FIG. 3) disposed on one surface thereof. A transparent cover plate 156 is fused directly on top of the code pattern 154. The transparent code and cover plates 152 and 156 are mounted in a fixed position.

In sliding contact with the cover plate 156 is a bearing plate 158 having a read head 160 rigidly attached thereto. In the preferred embodiment of the present invention, the code plate 152, cover plate 156 and bearing plate 158 are made of the same type of transparent material so there is no refractive index discontinuity between these plates.

The bearing plate 158 is coupled to one end of a shaft 164 via a flexible aligner 162. The shaft, which is supported by one or more sets of bearings 166, is also coupled to the object (not shown) whose position is to be determined. The flexible aligner prevents any radial or axial misalignments between the object and shaft 164 from causing a separation between the bearing plate 158 and the encoder plate 152.

An incoming beam of light 161a is directed by the read head 160 towards the code pattern 154. After passing through the code pattern, the beam is reflected off an inwardly mirrored surface 153 located on the remote side of encoder plate 152, and is received by the read head 160. The read head 160 transmits the reflected beam of light 161b over a fiber optic (not shown) to an optical detector (also not shown).

Movement of the object whose position is to be sensed causes a corresponding rotation of the shaft 164, which in turn moves the bearing plate 158 and read head 160 in relation to the encoder plate 152. Because movement of the read head 160 causes the incoming light beam 161a to pass through different sections of the code pattern 154 and change the intensity of the reflected light beam 161b, an indication of the relative position of the object with respect to the fixed encoder plate 152 is provided.

While preferred embodiments of rotational and linear optical position sensors have been described above, those skilled in the art will recognize that changes can be made therein without departing from the spirit and scope of the present invention. Hence, within the scope of the following claims it is to be understood that the invention can be practiced otherwise than as specifically described herein.

The embodiments of the invention in which an exclusive property or privilege is claimed are defined as follows:

1. An optical position sensor for determining the position of an object by varying the intensity of a beam of light as function of the position of the object, comprising:
    an encoder plate including an elongate code pattern whose density varies in a predetermined manner along the length of the code pattern such that the intensity of a beam of light passing through the code pattern varies depending upon where the beam of light passes through the code pattern;
    code pattern reading means for directing a beam of light through a portion of the code pattern and receiving the beam of light after the beam has passed through said portion of the code pattern, said code pattern reading means including a bearing plate and a read head, said bearing plate disposed in contact with said encoder plate, said read head rigidly affixed to said bearing plate for receiving the beam of light after the beam of light has passed through said portion of said code pattern; and
    a linkage for coupling an object whose position is to be determined to either the encoder plate or the bearing plate such that as the object moves, the portion of the code pattern through which said beam of light passes is altered whereby the intensity of the beam of light received by the read head is a function of the position of the object.

2. The optical position sensor of claim 1, wherein said linkage includes:
    a flexible aligner for coupling the object to either said bearing plate or said encoder plate.

3. The optical position sensor of claim 1, wherein the encoder plate includes an inwardly mirrored surface and wherein the read head directs the beam of light through said portion of the code pattern towards the mirrored surface and receives the beam of light reflected by said mirrored surface.

4. The optical position sensor of claim 1, wherein said code pattern reading means includes a light source disposed on the opposite side of said encoder plate from said read head in alignment with said read head.

5. The optical position sensor of claim 1, wherein said encoder plate and said bearing plate are made of a material having approximately the same index of refraction.

6. The optical position sensor of claim 1, further comprising a series of channels disposed between said bearing plate and said encoder plate and wherein said optical position sensor includes a lubricant located in said channels for reducing abrasion between said encoder plate and said bearing plate.

7. The optical position sensor of claim 5, wherein said lubricant is an oil having approximately the same index of refraction as said encoder plate and said bearing plate.

8. The optical position sensor of claim 1, wherein said encoder plate is a circular disk and said code pattern is an analog pattern whose density varies linearly about a perimeter of said encoder plate.

9. The optical position sensor of claim 1, wherein said encoder plate further comprises a cover plate disposed between said code pattern and said bearing plate.

10. The optical position sensor of claim 1, wherein said code pattern is a digital pattern that varies about a perimeter of said encoder plate.

11. An optical position sensor for determining the position of an object by varying the intensity of a beam of light as function of the position of the object, comprising:
    an encoder plate including a code pattern for varying the intensity of a beam of light as the beam of light passes through a portion of the code pattern and the relative position of the beam with respect to the code pattern changes, said encoder plate including an inwardly mirrored surface that reflects the beam of light after the beam of light has passed through the code pattern;
    a bearing plate disposed in contact with the encoder plate;
    a read head rigidly affixed to the bearing plate for directing a beam of light through a portion of the code pattern and reading the reflected beam of light;
    a linkage for coupling an object whose position is to be determined to either the encoder plate or the bearing plate such that as the object moves the relative position of the beam with respect to the code pattern changes thereby varying the intensity of the reflected beam of light whereby the intensity of the light beam is a function of the position of the object.

12. The optical position sensor of claim 11, wherein said linkage includes:
    a flexible aligner for coupling either the bearing plate or the encoder plate to the object such that the encoder plate and the bearing plate remain in contact as the object moves.

13. The optical position sensor of claim 11, further comprising a series of channels disposed between said bearing plate and said encoder plate, said optical position sensor including a lubricant located in said channels for reducing abrasion between said encoder plate and said bearing plate.

14. The optical position sensor of claim 11, wherein said encoder plate and said bearing plate have approximately the same index of refraction.

15. The optical position sensor of claim 13, wherein the lubricant is an oil having approximately the same index of refraction as said encoder plate and said bearing plate.

16. The optical sensor of claim 11, wherein said encoder plate is a circular disk and wherein said code pattern comprises an analog pattern whose density varies linearly about a perimeter of said encoder plate.

17. The optical position sensor of claim 11, wherein the encoder plate further comprises a cover plate disposed between said code pattern and said bearing plate.

* * * * *